(12) United States Patent
Zhan

(10) Patent No.: US 7,547,494 B2
(45) Date of Patent: Jun. 16, 2009

(54) COLOR FILTER SUBSTRATE, MANUFACTURING METHOD THEREOF AND LIQUID CRYSTAL DISPLAY

(75) Inventor: Hongming Zhan, Beijing (CN)

(73) Assignee: Beijing BOE Optoelectronics Technology Co., Ltd. (CN)

( * ) Notice: Subject to any disclaimer, the term of this patent is extended or adjusted under 35 U.S.C. 154(b) by 0 days.

(21) Appl. No.: 11/956,143

(22) Filed: Dec. 13, 2007

(65) Prior Publication Data

US 2008/0182184 A1    Jul. 31, 2008

(30) Foreign Application Priority Data

Jan. 25, 2007    (CN) .................. 2007 1 0063049

(51) Int. Cl.
*G03F 1/00*    (2006.01)

(52) U.S. Cl. ........................... 430/7; 349/106

(58) Field of Classification Search ............... None
See application file for complete search history.

(56) References Cited

U.S. PATENT DOCUMENTS 6,099,993 A * 8/2000 Kim et al. .................. 430/7

FOREIGN PATENT DOCUMENTS

JP    5-157907 A  *  6/1993

OTHER PUBLICATIONS

Computer-generated translation of JP 5-157907 (Jun. 1993).*

* cited by examiner

*Primary Examiner*—John A. McPherson
(74) *Attorney, Agent, or Firm*—Sheridan Ross PC

(57) ABSTRACT

Provided is a color filter substrate that comprises a substrate. A black matrix, a color filter layer, and a transparent conductive layer are formed on the substrate and the color filter layer is formed in a pixel area defined by the black matrix. A metal conductivity-enhanced layer is formed above and/or below the transparent conductive layer and contacts with the transparent conductive layer in an area corresponding to the black matrix.

10 Claims, 2 Drawing Sheets

COLOR FILTER SUBSTRATE, MANUFACTURING METHOD THEREOF AND LIQUID CRYSTAL DISPLAY

The present application claims the priority of Chinese patent application No. 200710063049.1 filed on Jan. 25, 2007 with the Chinese Intellectual Property Office, which is incorporated herewith by reference.

BACKGROUND OF THE INVENTION

The present invention relates to a color filter substrate, a method for manufacturing the same, and a liquid crystal display (LCD).

With development of the display technologies, thin film transistor liquid crystal displays (TFT LCDs) have become the mainstream of the display market. Currently, a TFT LCD is developed to have the characteristics of full color, large size, high definition, etc. Color filters are important for a TFT LCD device to realize colorful display. A TFT LCD generally comprises a TFT array substrate, a color filter substrate, and a liquid crystal layer interposed therebetween.

Generally, the color filter substrate is constructed so that a black matrix (BM) is provided on a transparent glass substrate for shielding light, a color filter layer is formed in pixel areas defined by the black matrix, and a transparent conductive layer (counter electrode) of, for example, indium tin oxide is formed on the BM and the color filter layer.

FIG. 1 is a schematic view of the structure of a conventional color filter substrate. As shown in FIG. 1, the conventional color filter substrate comprises a glass substrate 1, a black matrix 2, and a color filter layer 3. The black matrix 2 is provided on the surface of the substrate 1, and the black matrix 2 has a plurality of grid areas, within which the substrate surface is exposed. The grid areas are the pixel areas corresponding to the pixel areas formed on the TFT substrate. The color filter layer 3 is provided in each of the grid areas of the black matrix 2 and also partially overlaps with the black matrix 2, as shown in FIG. 1. A transparent conductive layer 4 (e.g., an ITO layer) covers above the color filter layer 3 and the black matrix 2. The transparent conductive layer 4 as a counter electrode is normally connected with a counter electrode power source, and generates a certain electrical field in corporation with a pixel electrode provided on the TFT substrate that is opposite to the color filter substrate to control the rotation of the liquid crystal molecules and thereby control the transmittance of the liquid layer for displaying an image.

The transparent conductive layer 4 is required to have low sheet resistance and high visible light transmittance. Currently, the transparent conductive layer 4 of the color filter substrate is generally about 1500 Å in thickness and about 20~30Ω in sheet resistance, which are satisfied for the required display quality of a small size LCD monitor (less than 30 inches). However, for a large size LCD TV set (larger than 30 inches), the influence of large sheet resistance on display quality becomes remarkable, especially on uniformity of display luminance. On the other hand, for a whole LCD device, too large sheet resistance means increased power consumption. An increased thickness of the transparent conductive layer 4 may effectively reduce the sheet resistance, however, increase of the thickness of the transparent conductive layer 4 makes transmittance reduced highly.

In addition, in the conventional color filter substrate, the black matrix 2 and the color filter layer 3 partially overlap with each other to prevent light leakage. Thus, there must be generated a surface step at the positions where the black matrix 2 and the color filter layer 3 overlap with each other. Such step leads to unevenness of the transparent conductive film 4, further causes non-uniformity of the electrical field formed in the central portion and at the edge of the pixel areas and degrades the image quality. FIG. 2 shows the distribution| [zhan1] of the electrical field formed between the two substrates.

SUMMARY

In view of the above problems, the present invention provides a color filter substrate, a method for manufacturing the color filter substrate, and a liquid crystal display (LCD).

In a first aspect of the invention, there is provided a color filter substrate. The color filter substrate comprising a substrate and a black matrix, a color filter layer, and a transparent conductive layer formed on the substrate. A metal conductivity-enhanced layer is formed above and/or below the transparent conductive layer and contacts with the transparent conductive layer in an area corresponding to the black matrix.

Preferably, the metal conductivity-enhanced layer may comprise copper (Cu), aluminum (Al), molybdenum (Mo), zinc (Zn), silver (Ag), or an alloy thereof, and the transparent conductive layer may be indium tin oxide, indium zinc oxide, aluminum zinc oxide, or zinc oxide.

Preferably, the transparent conductive layer is formed on the substrate, and the black matrix and the color filter layer are formed on the transparent conductive layer; alternatively, the black matrix and the color filter layer are formed on the substrate, and the transparent conductive layer is formed on the black matrix and the color filter layer.

In a second aspect of the invention, there is provided a method for manufacturing the color filter substrate. A black matrix is formed on a substrate, a color filter layer is formed in a pixel area defined by the black matrix on the substrate, and a metal conductivity-enhanced layer and a transparent conductive layer contacting with each other are formed on the substrate. The metal conductivity-enhanced layer is formed in an area corresponding to the black matrix above and/or below the transparent conductive layer.

In a third aspect of the invention, there is provided a LCD, which comprises a thin film transistor array substrate, the color filter substrate described above, and a liquid crystal layer therebetween.

Compared with the conventional color filter substrate, since a counter electrode is formed of a double-layer structure of a transparent conductive layer/a metal conductivity-enhanced layer or a metal conductivity-enhanced layer/a transparent conductive layer in the area corresponding to the black matrix, the color filter substrate of the embodiments of the present invention can effectively reduce the sheet resistance of the counter electrode and increases the luminance uniformity of the LCD comprising the color filter substrate and the transmittance of the transparent conductive layer of the pixel area is not influenced. The color filter substrate according to the embodiments of the present invention can be used for a large size LCD, for example, a TV set. In the color filter substrate of the embodiments of the present invention, a transparent conductive layer/a metal conductivity-enhanced layer double structure or a metal conductivity-enhanced layer/a transparent conductive layer double structure may be directly formed on the substrate first. This planar electrode design can effectively reduce the non-uniformity of the electrical field generated in the central portion and at the edge of the pixel areas and increase the display quality of the LCD.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Exemplary embodiments of the present invention will be described hereinafter with reference to the accompanying drawings. It will be understood that when a layer or an element is referred to as being "on" or "connected to" another layer or substrate, it can be directly on or connected to the other layer or element, or an intervening layer may also be present therebetween. The same reference number refers to the same part in the following drawings.

In the embodiments of the invention, a metal layer of copper (Cu), aluminum (Al), molybdenum (Mo), zinc (Zn), silver (Ag) or an alloy thereof is formed above and/or below a transparent conductive layer in an area corresponding to a black matrix on a color filter substrate, so as to reduce sheet resistance of a counter electrode comprising the transparent conductive layer. Meanwhile, transmittance of the pixel areas defined by the black matrix is not influenced. The metal layer is referred to a metal conductivity-enhanced layer in this disclosure. A LCD according to the embodiments of the present invention comprises a thin film transistor (TFT) substrate, a color filter substrate, and a liquid crystal layer interposed between the substrates. Hereinafter, the embodiments of the invention are described in detail and are not limitative to the present invention.

The First Embodiment

Figure 3:
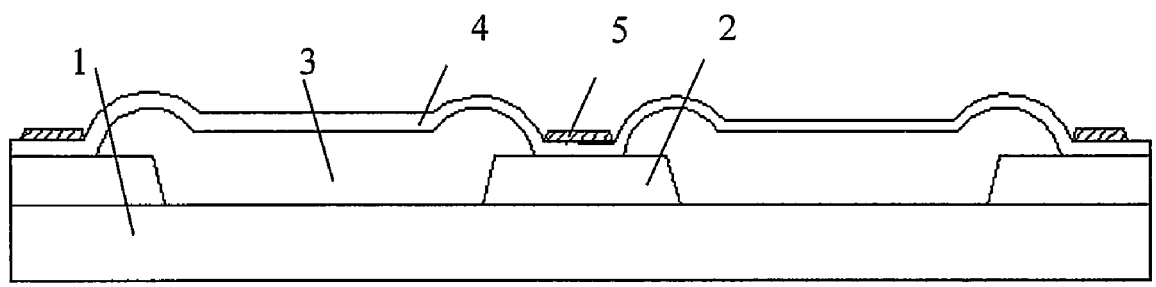
FIG. 3 is a plan view of a color filter substrate according to the first embodiment of the present invention.
Figure 4:
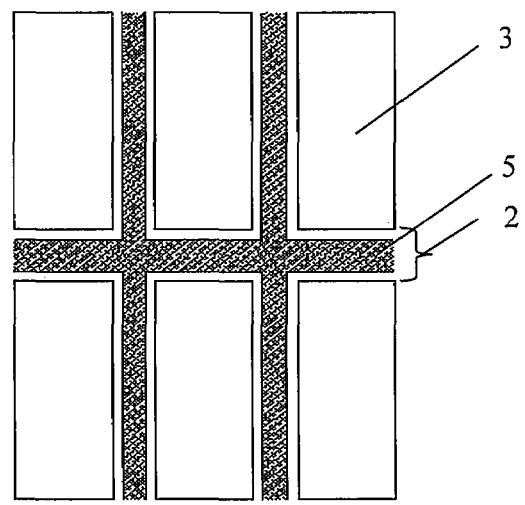
FIG. 4 is a schematic cross-sectional view taken along the line A-A in FIG. 3.

FIG. 3 is a plan view of a color filter substrate according to the first embodiment of the present invention, and FIG. 4 is a cross-sectional view of the color filter substrate taken along the line A-A in FIG. 3. As shown in FIGS. 3 and 4, the color filter substrate comprises a substrate 1 such as a glass substrate, and a black matrix 2, a color filter layer 3, a transparent conductive layer 4, and the like, which are formed on the substrate 1. The black matrix 2 is provided on the surface of the substrate 1, and the black matrix 2 has a plurality of grid areas. The substrate surface within each of the grid areas is exposed. The color filter layer 3 is provided in each of the grid areas of the black matrix 2 and partially overlaps with the black matrix 2 in order to prevent light leakage. The transparent conductive layer 4 covers the color filter layer 3 and the black matrix 2, and the transparent conductive layer 4 may be a layer of indium tin oxide (ITO), indium zinc oxide (IZO), aluminum zinc oxide (AZO), zinc oxide ($ZnO_2$), and the like. A metal conductivity-enhanced layer 5 is formed on an area of the transparent conductive layer 4 and contacts with the layer 4, and such area is located above the black matrix 2, so that a counter electrode that comprises the transparent conductive layer in a conventional color filter substrate is modified into a double-layer counter electrode that comprises the metal conductivity-enhanced layer 5 and the transparent conductive layer 4 of the embodiment of the present invention. Thus, the sheet resistance of the counter electrode is effectively reduced with transmittance of the pixel area being not influenced, and the luminance uniformity of a LCD using the color filter substrate, for example, a large size LCD, can be improved.

The structure in the first embodiment may be modified, for example, by providing the metal conductivity-enhanced layer 5 between the black matrix 2 and the transparent conductive layer 4, that is, the metal conductivity-enhanced layer 5 is below the transparent conductive layer 4, the detailed description of which is omitted herein for simplicity.

The Second Embodiment

Figure 5:
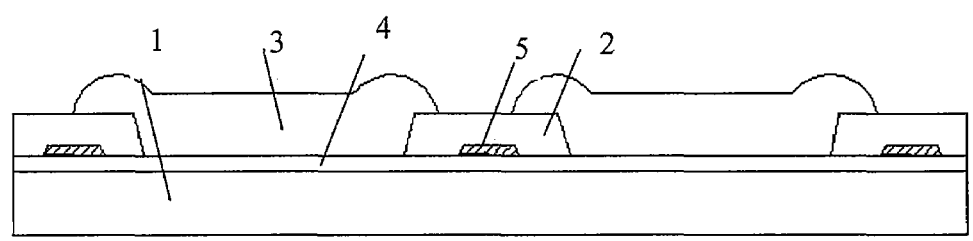
FIG. 5 is a schematic cross-sectional view of a color filter substrate according to the second embodiment of the present invention.

FIG. 5 is a schematic cross-sectional view of the color filter substrate according to the second embodiment of the invention. As shown in FIG. 5, the color filter comprises a substrate 1 and a black matrix 2, a color filter layer 3, a transparent conductive layer 4, and the like, which are formed on the substrate 1. In the second embodiment, the transparent conductive layer 4 is formed directly on the substrate 1, and then a metal conductivity-enhanced layer 5, such as a layer of copper (Cu), aluminum (Al), molybdenum (Mo), zinc (Zn), silver (Ag) or an alloy thereof, is deposited in an area on the surface of the layer 4 in which the black matrix 2 is to be formed later and contacts the transparent conductive layer 4. Subsequently, the black matrix 2 is provided above the transparent conductive layer 4 and the metal conductivity-enhanced layer 5, and the black matrix 2 has a plurality of grid areas, through which the surface of the transparent conductive layer 4 within the grid areas is exposed. Finally, the color filter layer 3 is formed in the grid areas of the black matrix 2 and partially overlaps with the black matrix 2 in order to prevent light leakage.

Figure 1:
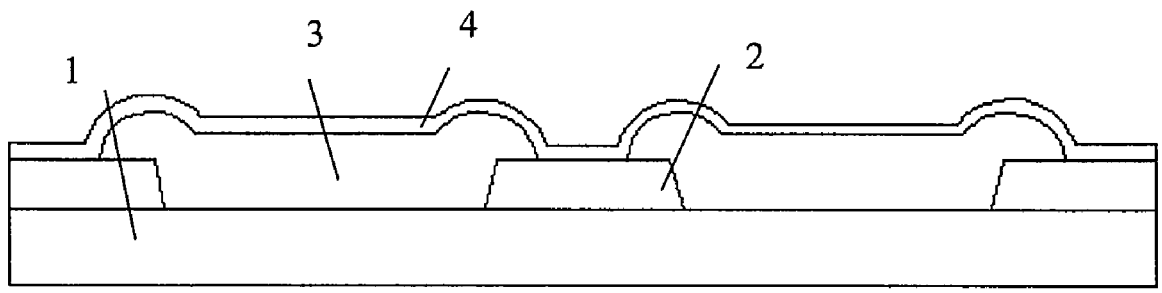
FIG. 1 is a schematic cross-sectional view of a conventional color filter substrate.
Figure 2:
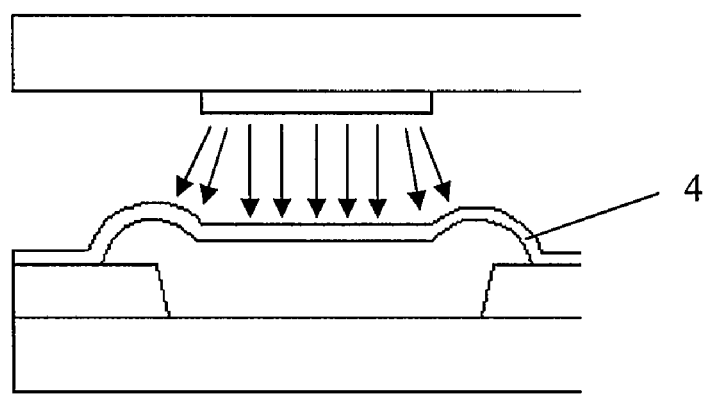
FIG. 2 is a schematic view of electrical field distribution of the conventional color filter substrate.
Figure 6:
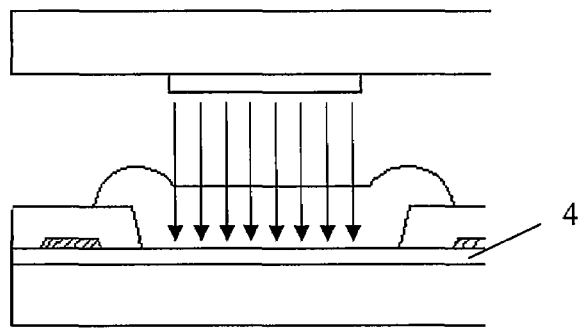
FIG. 6 is a schematic view of the electrical field distribution according to the second embodiment of the present invention.

In the second embodiment, since a double-layer structure of transparent conductive layer 4 and metal conductivity-enhanced layer 5 is used to constitute the counter electrode of the color filter substrate, the sheet resistance of the counter electrode is reduced and the luminance uniformity of a LCD using the color filter substrate is improved, with transmittance of the pixel areas being not influenced. In addition, in the second embodiment, the transparent conductive layer 4 and the metal conductivity-enhanced layer 5 are formed below the black matrix 2. That is, the transparent conductive layer 4 as a first layer is directly deposited on the substrate, and then the metal conductivity-enhanced layer 5 as a second layer is deposited on the transparent layer 4, so that the color filter substrate in the second embodiment becomes more planar compared with the conventional color filter substrate and that of the first embodiment, effectively reduces the non-uniformity of the electrical field in the central portion and at the edges of the pixel areas, and increases the display quality of the LCD. FIG. 6 shows a schematic view of the electrical filed distribution of the LCD using the color filter substrate of the second embodiment, which is more uniform than that of the conventional LCD as shown in FIG. 2.

The Third Embodiment

Figure 7:
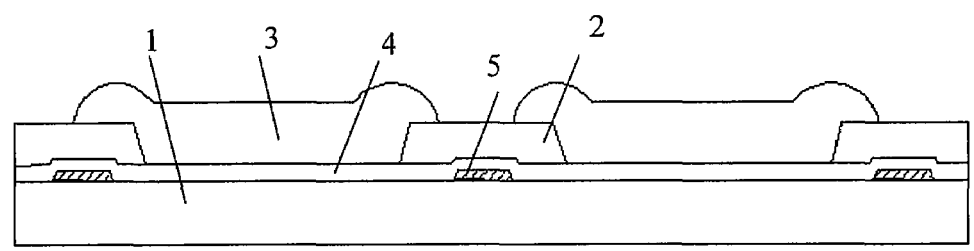
FIG. 7 is a schematic cross-sectional view of a color filter substrate according to the third embodiment of the present invention.

FIG. 7 is a schematic cross-sectional view of a color filter substrate according to the third embodiment of the invention. As shown in FIG. 7, the color filter substrate in the third embodiment is similar to that in the second embodiment, except that a metal conductivity-enhanced layer 5 is first formed in an area on a substrate 1 corresponding to a black matrix 2 to be formed. Subsequently, a transparent conductive layer 4 is formed on the metal conductivity-enhanced layer 5, and then the black matrix 2 and a color filter layer 3 are formed on the transparent conductive layer 4. The black matrix 2 has a plurality of grid areas, and the surface of the transparent conductive layer 4 within each of the grid areas is exposed. The color filter layer 3 is provided in each of the grid areas of the black matrix 2 and partially overlaps with the black matrix 2 in order to prevent light leakage.

Also, in the third embodiment, a double-layer structure of the metal conductivity-enhanced layer 5 and the transparent conductive layer 4 constitutes a counter electrode, which effectively reduces the sheet resistance of the counter electrode and increases the luminance uniformity of a LCD using the color filter substrate, for example, a large size LCD, with the transmittance of the pixel areas being not influenced. In addition, the color filter substrate in the third embodiment is more planar compared with the conventional color filter substrate and that of the first embodiment, reduces the non-uniformity of the electrical field, especially in the central portion and at the edge of the pixel areas, and increases the display quality.

As shown above, the embodiments of the invention employ a counter electrode of a double-layer structure of a transparent conductive layer/a metal conductivity-enhanced layer or a metal conductivity-enhanced layer/a transparent conductive layer, which effectively reduces the sheet resistance of the counter electrode with the transmittance of the pixel areas being not influenced, and thereby increases the luminance uniformity of a LCD using the color filter substrate, for example, a large size LCD. In addition, in the embodiments of the invention, a transparent conductive layer/a metal conductivity-enhanced layer or a metal conductivity-enhanced layer/a transparent conductive layer on the substrate may be formed first on the substrate to improve the planarness. This kind of planar electrode design contributes to reducing the non-uniformity of the electrical field in the central portion and at the edge of the pixel areas and increasing the display quality.

The above embodiments are the preferred embodiments of the invention. Actually various modifications may be performed on the invention, for example, metal conductivity-enhanced layers may be simultaneously provided both above and below the transparent conductive layer in the area corresponding to the black matrix, which also leads to the effect of reducing the non-uniformity of the generated electrical field and improving the uniformity of luminance.

In another embodiment of the present invention, there is provided a LCD comprising the above color filter substrate of the embodiments of the present invention, a TFT substrate, a liquid crystal layer interposed therebetween. By forming a counter electrode of a double-layer structure of a transparent conductive layer/a metal conductivity-enhanced layer or a metal conductivity-enhanced layer/a transparent conductive layer, the sheet resistance of the counter electrode is reduced and display quality of the LCD is improved accordingly.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A color filter substrate, comprising:
   a substrate;
   a black matrix, a color filter layer, and a transparent conductive layer formed on the substrate, the color filter layer being formed in a pixel area defined by the black matrix; and
   a metal conductivity-enhanced layer, formed above and/or below the transparent conductive layer and contacting with the transparent conductive layer, in an area corresponding to the black matrix;
   wherein the transparent conductive layer is formed on the substrate, and the black matrix and the color filter layer are formed on the transparent conductive layer.

2. The color filter substrate of claim 1, wherein the metal conductivity-enhanced layer comprises copper (Cu), aluminum (Al), molybdenum (Mo), zinc (Zn), silver (Ag), or an alloy thereof.

3. The color filter substrate of claim 1, wherein the transparent conductive layer is indium tin oxide, indium zinc oxide, aluminum zinc oxide, or zinc oxide.

4. The color filter substrate of claim 1, wherein the color filter layer partially overlaps with the black matrix.

5. A liquid crystal display comprising a thin film transistor array substrate, the color filter substrate of claim 1, and a liquid crystal layer interposed therebetween.

6. The liquid crystal display of claim 5, wherein the color filter layer overlaps with the black matrix.

7. A method for manufacturing a color filter substrate, comprising the steps of:
   forming a black matrix on a substrate,
   forming a color filter layer in a pixel area defined by the black matrix on the substrate, and
   forming a metal conductivity-enhanced layer and a transparent conductive layer contacting with each other on the substrate,
   wherein the transparent conductive layer is formed on the substrate, and the black matrix and the color filter layer are formed on the transparent conductive layer, and
   wherein the metal conductivity-enhanced layer is formed in an area corresponding to the black matrix above and/or below the transparent conductive layer.

8. The method of claim 7, wherein the metal conductivity-enhanced layer comprises copper (Cu), aluminum (Al), molybdenum (Mo), zinc (Zn), silver (Ag), or an alloy thereof.

9. The method of claim 7, wherein the material of the transparent conductive layer is indium tin oxide, indium zinc oxide, aluminum zinc oxide, or zinc oxide.

10. The method of claim 7, wherein the color filter layer partially overlaps with the black matrix.

* * * * *